(12) United States Patent
Anandan et al.

(10) Patent No.: US 11,024,843 B2
(45) Date of Patent: Jun. 1, 2021

(54) LITHIUM TITANATE ANODE AND FABRICATION METHOD FOR SOLID STATE BATTERIES

(71) Applicant: Ford Global Technologies, LLC, Dearborn, MI (US)

(72) Inventors: Venkataramani Anandan, Farmington Hills, MI (US); Daniel Murray, Plymouth, MI (US); Andy Robert Drews, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 379 days.

(21) Appl. No.: 15/871,565

(22) Filed: Jan. 15, 2018

(65) Prior Publication Data
US 2019/0221841 A1  Jul. 18, 2019

(51) Int. Cl.
| | |
|---|---|
| *H01M 50/40* | (2021.01) |
| *H01M 4/485* | (2010.01) |
| *H01M 4/38* | (2006.01) |
| *H01M 4/131* | (2010.01) |
| *H01M 4/02* | (2006.01) |
| *H01M 10/0585* | (2010.01) |
| *H01M 10/0562* | (2010.01) |
| *H01M 10/0525* | (2010.01) |

(52) U.S. Cl.
CPC .......... *H01M 4/382* (2013.01); *H01M 4/131* (2013.01); *H01M 4/485* (2013.01); *H01M 10/0525* (2013.01); *H01M 10/0562* (2013.01); *H01M 10/0585* (2013.01); *H01M 50/40* (2021.01); *H01M 2004/027* (2013.01)

(58) Field of Classification Search
CPC ............ H01M 4/382; H01M 10/0525; H01M 10/0562; H01M 4/485; H01M 10/0585; H01M 2/14; H01M 4/131; H01M 2004/027; H01M 4/362; H01M 4/62; H01M 4/1391; H01M 50/40; Y02E 60/10
See application file for complete search history.

(56) References Cited

U.S. PATENT DOCUMENTS

| | | | |
|---|---|---|---|
| 2009/0092903 A1 | 9/2009 | Johnson et al. | |
| 2012/0231350 A1 | 9/2012 | Nishida et al. | |
| 2013/0059204 A1* | 3/2013 | Holzapfel | H01M 4/5825 429/231.1 |
| 2013/0189582 A1* | 7/2013 | Lee | H01M 4/485 429/225 |
| 2014/0287305 A1* | 9/2014 | Wachsman | H01M 10/052 429/211 |
| 2015/0333307 A1 | 11/2015 | Thokchom et al. | |
| 2019/0157724 A1* | 5/2019 | Wolter | H01M 2/1646 |

OTHER PUBLICATIONS

Yi et al., Journal of Physics and Chemistry of Solids 71 (2010) 1236-1242 (Year: 2010).*

* cited by examiner

*Primary Examiner* — Kwang Han
(74) *Attorney, Agent, or Firm* — David B. Kelley; Brooks Kushman P.C.

(57) ABSTRACT

A solid-state battery includes a positive electrode, a negative electrode, and a separator between the positive and negative electrodes. The negative electrode includes reduced lithium titanate (LTO) particles and solid electrolyte particles. The negative electrode lacks electronically conductive additives.

20 Claims, 2 Drawing Sheets

US 11,024,843 B2

LITHIUM TITANATE ANODE AND FABRICATION METHOD FOR SOLID STATE BATTERIES

TECHNICAL FIELD

The present disclosure relates to a solid-state battery, and a method of making the same.

BACKGROUND

Solid state batteries (SSBs) provide an alternative to conventional lithium-ion batteries with liquid electrolytes. Typically, SSBs include solid electrodes and a solid electrolyte material. The solid electrolytes are resistant to lithium dendrites, which can lead to internal short circuits and are an alternative to flammable and unstable liquid battery electrolytes. Solid electrolytes for SSBs are typically used as separators between the two electrodes and must be highly conductive to lithium ions, but have very low electronic conductivity. As a result, SSBs may have very low self-discharge rates. Because of the materials used, SSBs reduce electrolyte leakage and reactions between the electrolyte and active materials, as well as providing a long shelf life and high energy density.

SSBs have the potential to provide other benefits over conventional lithium ion batteries, such as better energy density. Typically, in order to provide an energy density of more than about 700 Wh/L, a SSB must use lithium metal as the anode material. However, enabling lithium metal in a SSB is challenging due to lithium dendrite growth in the solid electrolyte separator, volume change of the anode during cycling, degradation of the lithium/electrolyte interface, and incompatibility with various solid electrolyte materials. One of the alternatives to a lithium metal based anode is lithium titanate (LTO). An LTO anode coupled with a high voltage cathode, such as LMNO, may be capable of delivering around 700 Wh/L. In addition, using LTO as the anode material typically provides benefits such as low volume change and good compatibility with various solid electrolytes, making LTO an attractive material for use in a SSB.

Various methods of forming SSBs have been developed. Yet, fabricating a high energy density SSB has been a challenge, for example due to high sensitivity of suitable solid electrolytes to atmospheric moisture. It has also been difficult to achieve good interfacial resistance between active material of the electrodes and the solid electrolyte particles. For example, sintering at high temperatures of about 900° C. is used to provide interfacial contact between the electrolyte and the active material, but poses issues for carbon as an electronic conductor due to the high temperatures.

SUMMARY

According to an embodiment, a solid-state battery is disclosed. The solid-state battery includes a positive electrode, a negative electrode, and a separator between the positive and negative electrodes. The negative electrode includes reduced lithium titanate (LTO) particles and solid electrolyte particles. Additionally, the negative electrode lacks electronically conductive additives.

According to one or more embodiments, the reduced LTO particles may be pristine LTO particles processed in a reducing atmosphere at a temperature of about 300-1200° C. Further, the reducing atmosphere may be a gas environment containing CO, $H_2$, hydrocarbons, $H_2/N_2$, $H_2/Ar$, or combinations thereof. In some embodiments, the reduced LTO particles may include oxygen defects. In other embodiments, the reduced LTO particles may include dopants. The dopants may be $Mg^{2+}$, $Zn^{2+}$, $Al^{3+}$, $Ni^{2+}$, $Mo^{6+}$, $Cu^{2+}$, or a combination thereof. In one or more embodiments, the electronically conductive additives may be carbon or metallic particles.

According to an embodiment, a method for forming a solid-state electrode assembly is disclosed. The method includes providing reduced LTO particles; mixing the reduced LTO particles with solid electrolyte particles to form a mixture; fabricating the mixture into an anode sheet; arranging the anode sheet with a separator sheet and a cathode sheet to form a stack; laminating the stack; and sintering the stack to form the assembly.

According to one or more embodiments, the fabricating may include tape casting the anode sheet. In some embodiments, the sintering may be in an inert atmosphere. Further, the inert atmosphere may be an argon or nitrogen atmosphere. In one or more embodiments, the providing may include processing pristine LTO in a reduced atmosphere at a temperature of about 300-1200° C. According to one or more embodiments, the method may further include doping pristine LTO with $Mg^{2+}$, $Zn^{2+}$, $Al^{3+}$, $Ni^{2+}$, $Mo^{6+}$, $Cu^{2+}$, or a combination thereof to form the reduced LTO particles. In some embodiments, the mixing may include selecting a ratio of reduced LTO particles to solid electrolyte particles based on predetermined desired capacity and rate capability.

According to an embodiment, a method for forming a solid-state electrode assembly is disclosed. The method includes providing a mixture of pristine LTO particles and solid electrolyte particles; fabricating the mixture into an anode sheet; arranging the anode sheet with a separator sheet and a cathode sheet to form a stack; laminating the stack; and sintering the stack in a reducing atmosphere to reduce the pristine LTO to reduced LTO.

According to one or more embodiments, the sintering may be in a gas environment containing CO, $H_2$, hydrocarbons, $H_2/N_2$, $H_2/Ar$, or combinations thereof. In some embodiments, the sintering may not reduce the separator and cathode sheets. In one or more embodiments, the sintering may be performed at at least about 300° C. In some embodiments, the fabricating may include tape casting the anode sheet. According to one or more embodiments, the method may further include selecting a ratio of pristine LTO particles to solid electrolyte to form the mixture based on predetermined desired capacity and rate capability of the reduced LTO.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Engineering the characteristics of the two separate conduction channels within the electrodes is particularly difficult for an all solid-state battery (SSB) cell. A major challenge of utilizing LTO in SSBs is the low electronic conductivity of LTO, which leads to poor rate performance. Unlike in traditional lithium ion batteries (where the electronic conductivity in LTO anode is enhanced by adding 1-3 wt. % carbon particles to the electrode slurry which is cast on a metal current collector, where the carbon particles forms a percolation network inside the electrode providing good pathway for electrons), using an anode structure containing carbon for a SSB is challenging because the SSB fabrication requires high temperature sintering (>700° C.), typically in air or an oxygen environment which may lead to carbon combustion. Performing the same operation in an inert environment may also fail because, at high temperatures, carbon may act as a reductant for the active material and solid electrolyte. Reduction of active material and solid electrolyte may lead to a loss of electronic conduction, ionic conduction, or both. This last problem may be overcome through the use of an oxide additive that is stable at high temperatures and electronically conductive, but achieving high conductivities is rare and often expensive.

Moreover, providing either conduction channel through the thickness of the electrode with a solid additive material may be difficult, since direct particle-to-particle contact is necessary for efficient conduction, either between conductive particles of solid material, or between conductive particles of solid material and the particles of the active material. Because both the electronic and ionic conduction additives require solid-solid contact with the active material particles, adding one component interferes with function of the other component. In some cases, the metallic particles (or electronic additive) may settle in between the solid electrolyte particles or solid electrolyte and active particles during the fabrication process, which may hinder the ionic conduction pathway leading to poor performance.

Figure 1A:
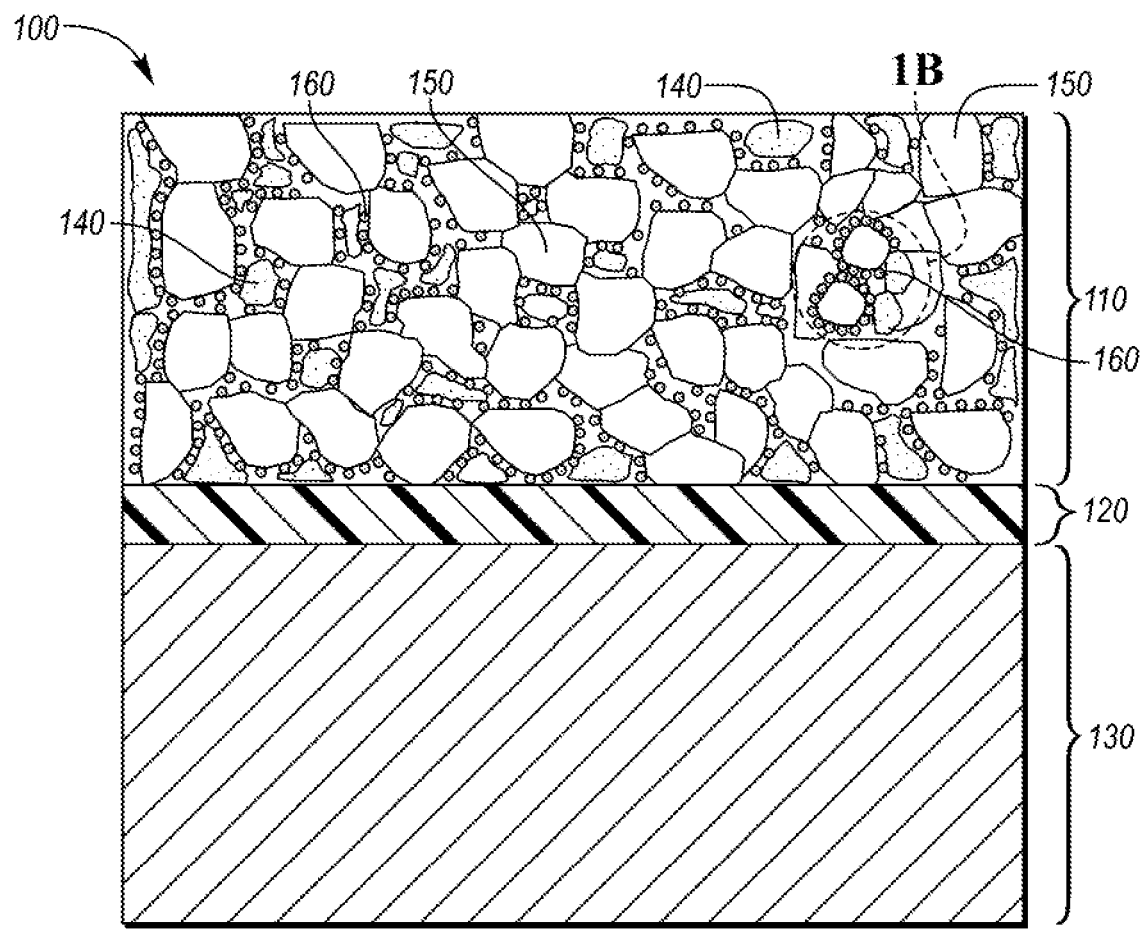
FIG. 1A shows a schematic illustration of a cross-section of a conventional solid-state battery.
Figure 1B:
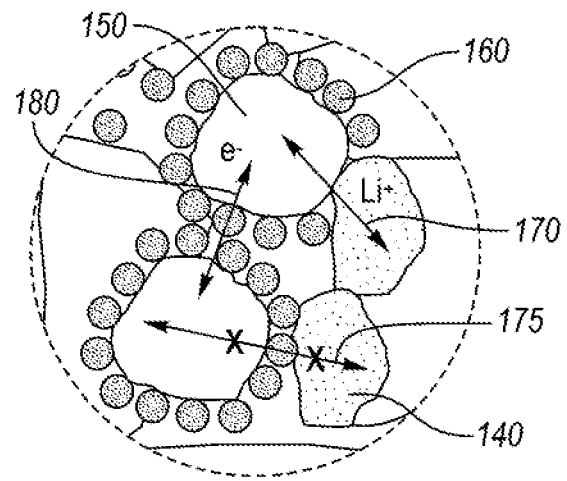
FIG. 1B shows a partial schematic illustration of a conventional anode of the solid-state battery of FIG. 1A.

FIGS. 1A and 1B depict a conventional solid-state battery 100. The solid-state battery 100 may be a primary, secondary, or rechargeable battery (e.g., a lithium-ion battery). The battery 100 includes negative and positive electrodes (anode 110 and cathode 130, respectively), and a separator 120 therebetween. Conventional anode 110 includes particles of solid electrolyte 140 and active material 150. The solid electrolyte 140 may be ionically conductive, with negligible electronic conductivity, forming a continuous network for ionic conduction throughout the battery. The active material 150 may be a source of lithium ions such as lithium metal or lithium titanate (LTO). The conventional anode 110 also includes particles of an electronic conductor 160, such as carbon or metallic particles, forming a continuous network for electronic conduction throughout the battery. Ionic pathways 170 are shown between the active material 150 and the solid electrolyte 140. Conductive pathways 180 are shown from active material 150 through electronic conductor particles 160. The separator 120 may be a non-porous separator, having ionic conductivity for transporting ions between the electrodes. The separator may be formed from a solid electrolyte material. The separator 120 has negligible electronic conductivity or is not electronically conductive, and thus cannot exchange electrons between the electrodes 110 and 130. The active material particles and solid electrolyte particles may be in contact with a current collector (not pictured), adjacent to the anode 110 or cathode 130. The current collector may be a metallic or metal foil current collector connecting the electrode to an external device (e.g., a motor). Examples of suitable metals and metal foils may include, but are not limited to, copper, aluminum, stainless steel, nickel, gold, or titanium.

As shown by blocked pathway 175 in FIG. 1B, using metallic or carbon particles such as electronic conductor 160 may result in particles settling in between the solid electrolyte particles or solid electrolyte 140 and active material 150 particles during the fabrication process, which could hinder the ionic conduction pathway 175, thus leading to poor performance and reduced energy density.

The present disclosure relates to maintaining both electronic and ionic conduction pathways within the positive electrode using a modified LTO active material and solid electrolyte particles. Thus, the present disclosure may reduce the need for an additional electronic conductor, such as carbon or metallic particles.

Figure 2A:
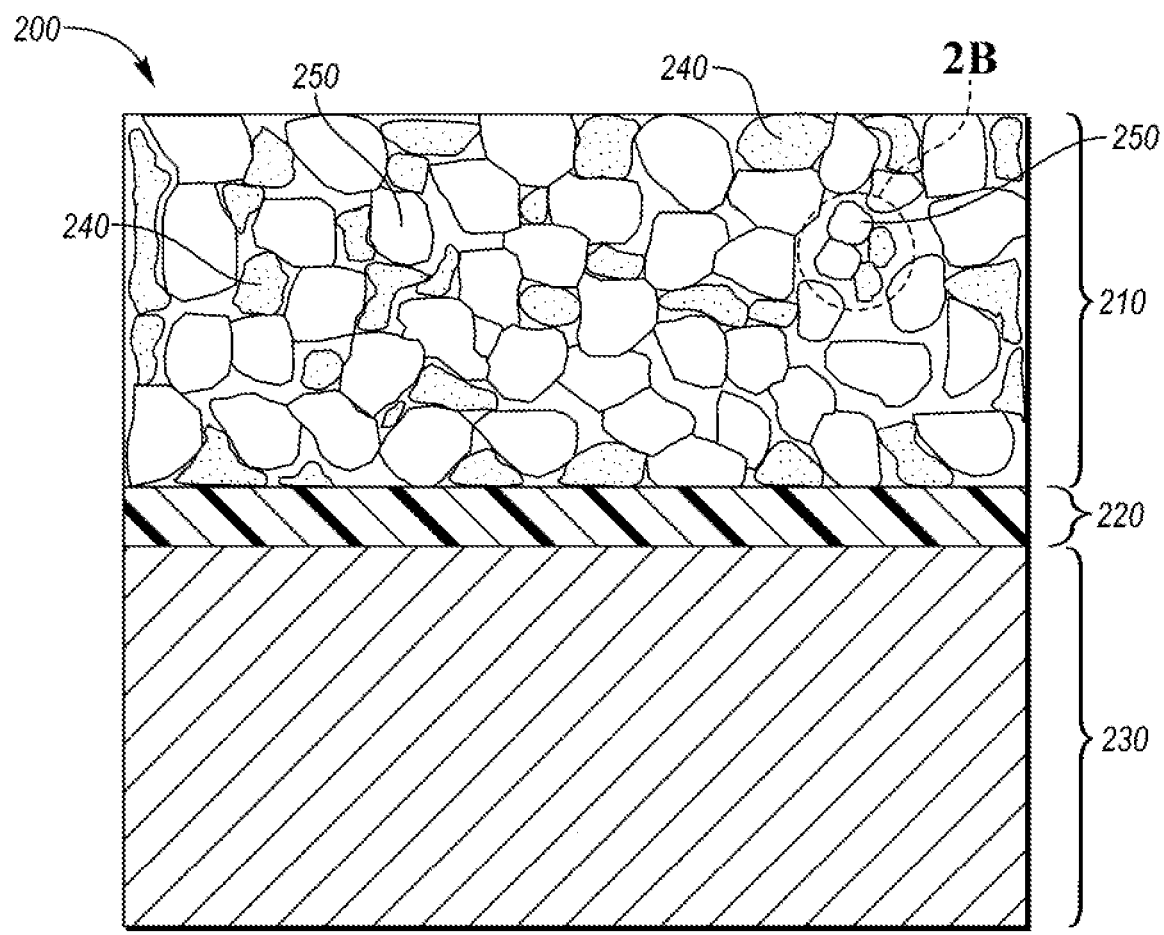
FIG. 2A shows a schematic illustration of a cross-section of a solid-state battery according to an embodiment.
Figure 2B:
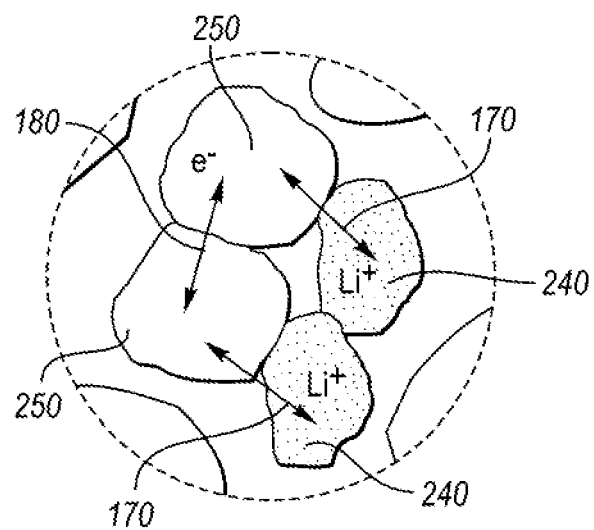
FIG. 2B shows a partial schematic illustration of an anode of the solid-state battery of FIG. 2A, according to an embodiment.

FIGS. 2A and 2B depict a solid-state battery 200, or electrode assembly 200, according to an embodiment. The solid-state battery 200 may be a primary, secondary, or rechargeable battery (e.g., a lithium-ion battery). The battery 200 includes negative and positive electrodes (anode 210 and cathode 230, respectively), and a separator 220 therebetween. Anode 210 includes particles of solid electrolyte 240 and active material 250. The solid electrolyte 240 may be conically conductive, with negligible electronic conductivity, forming a continuous network for ionic conduction throughout the battery. The separator 220 may be a non-porous separator, having ionic conductivity for transporting ions between the electrodes. The separator may be formed from a solid electrolyte material. The separator 220 has negligible electronic conductivity or is not electronically conductive, and thus cannot exchange electrons between the electrodes 210, and 230. The active material particles and solid electrolyte particles may be in contact with a current collector (not pictured), adjacent to the anode 210 or cathode 230. The current collector may be a metallic or metal foil current collector connecting the electrode to an external device (e.g., a motor). Examples of suitable metals and metal foils may include, but are not limited to, copper, aluminum, stainless steel, nickel, gold, or titanium.

The active material 250 is a modified lithium titanate (LTO-e) which has improved electronic conductivity over stoichiometric LTO (having an electronic conductivity <$10^{-9}$ S/cm). In some embodiments, the LTO-e may be a doped LTO, in another embodiment LTO-e may be a doped LTO or a pristine LTO reduced with oxygen defects. The LTO-e may be doped with $Mg^{2+}$, $Zn^{2+}$, $Al^{3+}$, $Ni^{2+}$, $Mo^{6+}$, $Cu^{2+}$, or a combination thereof, to improve the electronic conductivity. In other embodiments, the oxygen defects are introduced by processing pristine LTO particles in a reducing atmosphere, to form reduced LTO particles. The processing in a reducing atmosphere is generally done at high temperature using a gas environment containing hydrogen (e.g., CO, $H_2$, hydrocarbons, $H_2/N_2$, $H_2/Ar$) or other reducing gas mixture(s). The processing in a reducing atmosphere takes place at a high temperature, such as from about 300 to 1200° C. In another embodiment, the processing is at about 400 to 1100° C., and in yet another embodiment at about 500 to 1000° C. For example, LTO powder may be exposed to a reducing atmosphere at about 900° C. for about 10 hours to form LTO-e. The LTO-e in the anode 210 forms a continuous network for electronic conduction throughout the battery. Ionic pathways 170 are shown between the active material 250 and the solid electrolyte 240. Conductive pathways are shown between active material 250. According to one or more embodiments, ionic pathways 170 between the active material 250 and solid electrolyte 240 are not blocked by electronic additives, such as carbon or metallic particles, as in FIG. 1B.

By either doping or valence reduction in LTO, a change in the electronic band structure may result in an appreciable change in electronic conductivity in the LTO-e. When pristine LTO particles are processed in a reducing atmosphere, the reducing gas may react with the oxygen in the LTO to form $H_2O$. When oxygen is removed from the structure, a compensating reduction in valence of titanium may occur to balance the electrical charge ($Ti^{4+}$ to $Ti^{3+}$). Doping LTO or heating it in a reducing atmosphere may improve the electronic conductivity of the LTO-e by several orders in magnitude. In some embodiments, the two approaches may be combined. For example, LTO doped with Mo and heated at about 800° C. for about 5 hours in a 10% $H_2$/Ar environment was shown to have an electronic conductivity of $10^{-2}$ S/cm, an improvement by 7 orders-of-magnitude. This alteration of the electronic conductivity may not display any significant decrease in capacity or rate capability over a conventional SSB electrode, and maintains a high capacity.

The present disclosure also relates to forming the SSB with the LTO-e active material. The LTO-e may either be formed through a reduction process before incorporation into the SSB electrode, or reduced after being incorporated into the SSB electrode.

According to an embodiment, pristine LTO may be reduced to LTO-e prior to incorporation into the SSB electrode. In this embodiment, LTO-e powder is mixed with solid electrolyte particles to form an anode composite mixture. The ratio of LTO-e to solid electrolyte may be optimized to obtain the capacity and rate capability appropriate for the application. The powder composite mixture would then be fabricated into a thin sheet or sheet, forming the anode sheet. The sheet may be fabricated by any method such as, but not limited to, tape casting. Similarly, an electrolyte separator sheet containing only solid electrolyte and a cathode sheet containing cathode active material and solid electrolyte would be separately fabricated. The anode, separator, and cathode sheets are then arranged to form a stack, and then the stack is laminated. The laminated sheets are then sintered at high temperature to form a single electrochemical unit composed of dense layers with close particle-particle contacts. Sintering of the stack is completed in an inert atmosphere (e.g., argon or nitrogen).

According to another embodiment, pristine LTO may be used instead of LTO-e as the starting material. The ratio of pristine LTO to solid electrolyte may be optimized to obtain the capacity and rate capability appropriate for the application. The electrode and separator sheets are first fabricated and arranged, as described above, with the pristine LTO. After lamination, the stack containing pristine LTO is sintered. During the sintering the process, the stack is sintered at high temperature (e.g., 300-1200° C.) in a reducing atmosphere instead of inert atmosphere. In this method, the other components in the cell (other than the pristine LTO) are selected such that they are not affected by the reducing gas environment. During the sintering process, pristine LTO would be converted into LTO-e without affecting the other components in the SSB.

An LTO-e based SSB may be useful for 12 V auxiliary or starter batteries. Conventional LTO based Li-ion batteries for 12 V applications have problems with gas generation inside the cell at high temperature, which limits their use under the hood in the engine compartment. A SSB based on LTO would not suffer from this problem, and in fact, would perform significantly better at higher temperatures, both in terms of rate capability and cycle life.

The LTO-e based SSB described in the above embodiments may enable use of higher voltage cathode materials, further enhancing usable cell energy density to about 700 Wh/L. For Li-ion cell technology, increasing cell energy density through using higher voltage cathode materials is difficult due to the low operating voltage window of liquid electrolyte. Since solid electrolyte materials have high operating voltage windows, it could enable using higher voltage cathode materials. An LTO-e based SSB may also offer significant improvement in safety due to the elimination of a liquid electrolyte, which is present in the conventional Li-ion. In addition, an LTO-e based SSB may also result in simpler thermal management in a pack because of the high thermal stability of the solid electrolyte, which will reduce the cost at the pack level. As a result, LTO-e based SSBs may provide safe, high performance, and cost-effective solutions in the full suite of vehicle traction batteries, including EVs, PHEVs, and HEVs.

According to one or more embodiments, a SSB with an LTO-e active material is disclosed. A SSB based on a LTO-e active material may require little or no electronic conductive additive, as the LTO-e has improved electronic conductivity. As such, the processing complexity and potential incompatibilities in optimum processing conditions can be reduced. In addition to reducing processing complexity, the elimination of an electronically conductive additive allows for a higher loading of active material in the electrodes which enhances energy density, and allows for use of larger primary particles of LTO-e (over pristine LTO). Thus, providing a higher calendared density than is achievable for finer particles, and improved performance capabilities.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A solid-state battery comprising:
    a positive electrode;
    a negative electrode consisting of reduced lithium titanate (LTO) particles having an electronic conductivity 7 orders of magnitude greater than a pristine LTO electronic conductivity, the reduced LTO particles defining electronically conductive pathways, and solid electrolyte particles defining ionically conductive pathways, the negative electrode completely absent of electronically conductive additives such that the reduced LTO particles and solid electrolyte particles contact each other directly and the electronically and ionically conductive pathways are unobstructed by the electronically conductive additives; and
    a separator between the positive and negative electrodes, wherein the solid-state battery has a cell energy density of 700 Wh/L.

2. The solid-state battery of claim 1, wherein the reduced LTO particles are pristine LTO particles processed in a reducing atmosphere at a temperature of about 300-1200° C.

3. The solid-state battery of claim 2, wherein the reducing atmosphere is a gas environment containing CO, $H_2$, hydrocarbons, $H_2/N_2$, $H_2/Ar$, or combinations thereof.

4. The solid-state battery of claim 2, wherein the reduced LTO particles include oxygen defects.

5. The solid-state battery of claim 1, wherein the reduced LTO particles include dopants.

6. The solid-state battery of claim 5, wherein the dopants are $Mg^{2+}$, $Zn^{2+}$, $Al^{3+}$, $Ni^{2+}$, $Mo^{6+}$, $Cu^{2+}$, or a combination thereof.

7. The solid-state battery of claim 1, wherein the electronically conductive additives are carbon or metallic particles.

8. A method for forming a solid-state electrode assembly comprising:
   mixing reduced LTO particles having an electronic conductivity 7 orders of magnitude greater than a pristine LTO electronic conductivity with solid electrolyte particles to form a mixture of anode materials completely absent of electronically conductive additives;
   fabricating the mixture into an anode sheet;
   arranging the anode sheet with a separator sheet and a cathode sheet to form a stack;
   laminating the stack; and
   sintering the stack to form the assembly with the reduced LTO defining electronically conductive pathways in an anode and the solid electrolyte particles defining ionically conductive pathways in the anode, wherein the electronically and ionically conductive pathways are unobstructed by electronically conductive additives such that a cell energy density of the assembly is 700 Wh/L.

9. The method of claim 8, wherein the fabricating includes tape casting the anode sheet.

10. The method of claim 8, wherein the sintering is in an inert atmosphere.

11. The method of claim 10, wherein the inert atmosphere is an argon or nitrogen atmosphere.

12. The method of claim 8, further comprising processing pristine LTO in a reduced atmosphere at a temperature of about 300-1200° C. to form the reduced LTO particles.

13. The method of claim 8, further comprising doping pristine LTO with $Mg^{2+}$, $Zn^{2+}$, $Al^{3+}$, $Ni^{2+}$, $Mo^{6+}$, $Cu^{2+}$, or combination thereof to form the reduced LTO particles.

14. The method of claim 8, wherein the mixing includes selecting a ratio of reduced LTO particles to solid electrolyte based on predetermined desired capacity and rate capability.

15. A method for forming a solid-state electrode assembly comprising:
   providing a mixture of anode materials consisting of pristine LTO particles and solid electrolyte particles and completely absent of electronically conductive additives;
   fabricating the mixture into an anode sheet;
   arranging the anode sheet with a separator sheet and a cathode sheet to form a stack;
   laminating the stack; and
   sintering the stack in a reducing atmosphere to reduce the pristine LTO to reduced LTO having an electronic conductivity 7 orders of magnitude greater than a pristine LTO electronic conductivity such that the reduced LTO defines electronically conductive pathways in an anode and the solid electrolyte particles define ionically conductive pathways in the anode, and the electronically and ionically conductive pathways are unobstructed by electronically conductive additives such that a cell energy density of the solid-state battery is 700 Wh/L.

16. The method of claim 15, wherein the sintering is in a gas environment containing CO, $H_2$, hydrocarbons, $H_2/N_2$, $H_2/Ar$, or combinations thereof.

17. The method of claim 15, wherein the sintering does not reduce the separator sheet and cathode sheets.

18. The method of claim 15, wherein the sintering is performed at a temperature of at least about 300° C.

19. The method of claim 15, wherein the fabricating includes tape casting the anode sheet.

20. The method of claim 15, further comprising selecting a ratio of pristine LTO particles to solid electrolyte to form the mixture based on predetermined desired capacity and rate capability of the reduced LTO.

* * * * *